(12) United States Patent
Huggenberger

(10) Patent No.: US 11,056,980 B2
(45) Date of Patent: Jul. 6, 2021

(54) POWER CONVERTER

(71) Applicant: ABB Schweiz AG, Baden (CH)

(72) Inventor: Thomas Huggenberger, Untersiggenthal (CH)

(73) Assignee: ABB Schweiz AG, Baden (CH)

( * ) Notice: Subject to any disclaimer, the term of this patent is extended or adjusted under 35 U.S.C. 154(b) by 375 days.

(21) Appl. No.: 15/993,012

(22) Filed: May 30, 2018

(65) Prior Publication Data

US 2019/0006951 A1    Jan. 3, 2019

Related U.S. Application Data

(63) Continuation of application No. PCT/EP2016/079175, filed on Nov. 30, 2016.

(30) Foreign Application Priority Data

Nov. 30, 2015 (EP) .................................... 15197041

(51) Int. Cl.
*B60L 50/13* (2019.01)
*H02M 7/04* (2006.01)
(Continued)

(52) U.S. Cl.
CPC .................. *H02M 7/04* (2013.01); *B60L 7/14* (2013.01); *B60L 9/28* (2013.01); *B60L 50/13* (2019.02);
(Continued)

(58) Field of Classification Search
USPC .................................................. 307/9.1, 10.1
See application file for complete search history.

(56) References Cited

U.S. PATENT DOCUMENTS

2011/0316333 A1\* 12/2011 Still ........................ B60L 50/61
307/9.1

FOREIGN PATENT DOCUMENTS

DE    19630284    \*    1/1998
DE    19630284 A1    1/1998
(Continued)

OTHER PUBLICATIONS

European Patent Office, International Search Report & Written Opinion issued in corresponding Application No. PCT/EP2016/079175, dated Feb. 7, 2017, 13 pp.
(Continued)

*Primary Examiner* — Rexford N Barnie
*Assistant Examiner* — Xuan Ly
(74) *Attorney, Agent, or Firm* — Taft Stettinius & Hollister LLP

(57) ABSTRACT

A power converter (10) for operating a first electric machine (12) and a second electric machine (14), comprising:
a first converter element (16), a second converter element (18) and a first terminal connection (21), a second terminal connection (22) and a third terminal connection (23) for connecting the power converter (10) to a three-phase energy supply (60), wherein
the first converter element (16) comprises a first rectifier circuit (31) and a second rectifier circuit (32), the second converter element (18) comprises a third rectifier circuit (33), wherein
the first rectifier circuit (31) has a first AC-side pole (51) and a second AC-side pole (52), the second rectifier circuit (32) has a third AC-side pole (53) and a fourth AC-side pole (54) and the third rectifier circuit (33) has a fifth AC-side pole (55) and a sixth AC-side pole (56),
the first rectifier circuit (31) and the second rectifier circuit (32) are connected in parallel on the DC-voltage side and are
(Continued)

Figure 1:
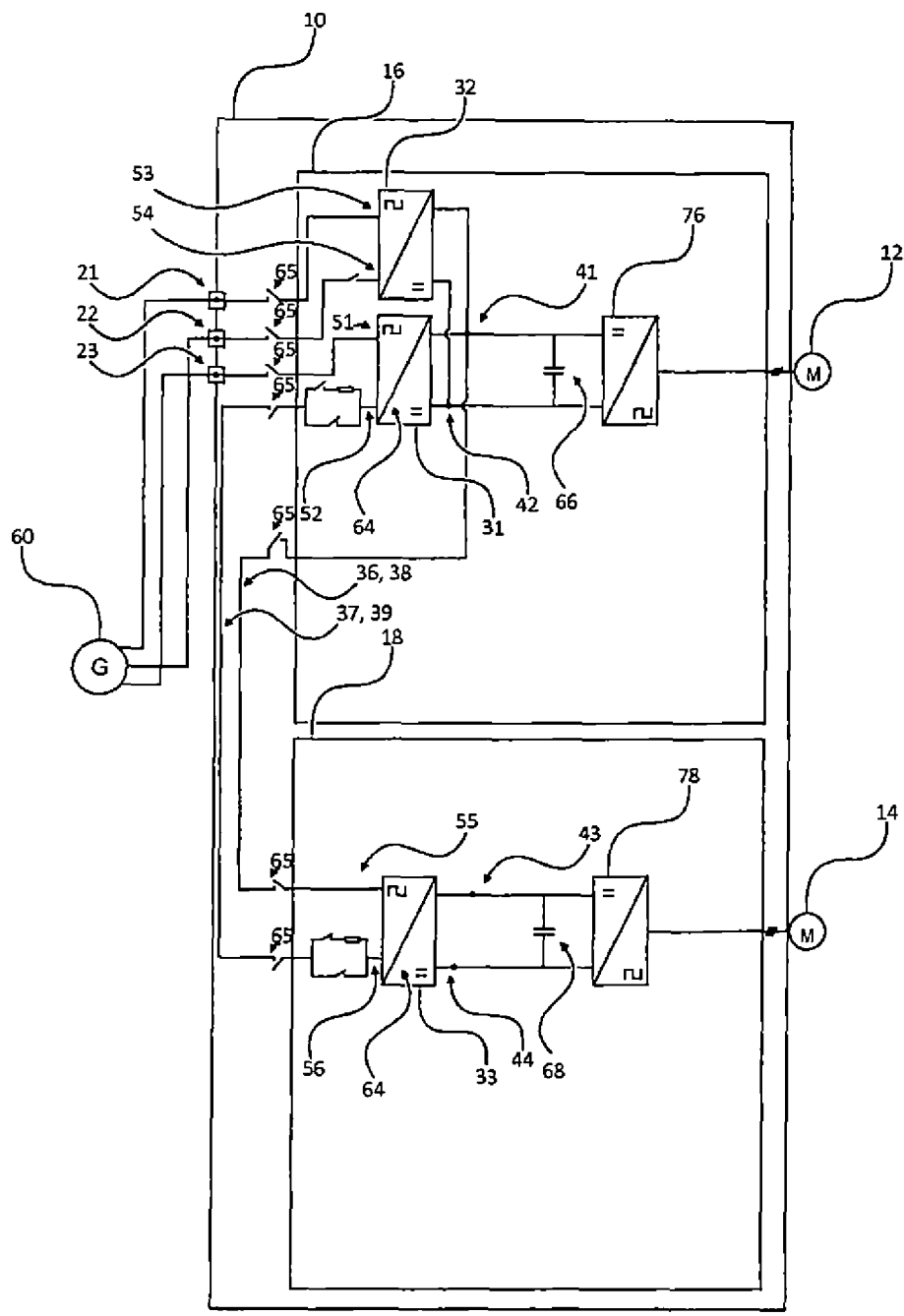

connected to a common first DC-voltage-side pole (41) and a common second DC-voltage-side pole (42), wherein the third rectifier circuit (33) is connected on the DC-voltage side to a third DC-voltage-side pole (43) and a fourth DC-voltage-side pole (44), wherein the first DC-voltage-side pole (41) is at least connectable to the third DC-voltage-side pole (43) by means of a first current path (36) and the second DC-voltage-side pole (42) is at least connectable to the fourth DC-voltage-side pole (44) by means of a second current path (37), wherein at least the first current path (36) or the second current path (37) comprises a semiconductor switch (64).

20 Claims, 2 Drawing Sheets

(51) Int. Cl.
    *H02P 27/06*     (2006.01)
    *B60L 9/28*     (2006.01)
    *B60L 7/14*     (2006.01)
    *H02M 7/493*     (2007.01)
    *H02M 1/10*     (2006.01)

(52) U.S. Cl.
    CPC ........... *H02P 27/06* (2013.01); *B60L 2200/26* (2013.01); *B60L 2210/30* (2013.01); *B60L 2210/40* (2013.01); *B60L 2270/20* (2013.01); *H02M 1/10* (2013.01); *H02M 7/493* (2013.01); *Y02T 10/70* (2013.01); *Y02T 10/7072* (2013.01); *Y02T 10/72* (2013.01)

(56) References Cited

FOREIGN PATENT DOCUMENTS

| | | |
|---|---|---|
| DE | 102009008549 A1 | 8/2010 |
| DE | 102010039699 A1 | 3/2012 |
| EP | 2689983 A1 | 1/2014 |

OTHER PUBLICATIONS

European Patent Office, Extended Search Report issued in corresponding Application No. 15197041.5, dated May 24, 2016, 11 pp.
ABB: "Product data sheet—BORDLINE CC1500 DE Propulsion and auxiliary converter for diesel-electric power cars for intercity trains," Dec. 31, 2012, retrieved from the Internet: https://library.e.abb.com/public/63bbb409644007cac1257ca700339ff4/PDS_BORDLINECC1500DE_M_1400_3BHS340077_ZAB_E08_RevB_lowres.pdf.
"Railvolution," Jan. 31, 2013, retrieved from the Internet: https://library.e.abb.com/public/026b0956eeae6b28c1257bb2002ab465/Railvolution01-13-ABB-Traction-converters-Russa.pdf.

\* cited by examiner

POWER CONVERTER

TECHNICAL FIELD

The present invention relates to the field of power converters, in particular power converters for operating electric machines. The present invention further relates to a drive unit.

PRIOR ART

Power converters are known very well to those skilled in the art. Power converters for operating electric machines typically comprise a converter element, that is to say a cascade connection of a rectifier, a DC voltage intermediate circuit and an inverter. If a power converter operates a multiplicity of electric machines, said power converter typically consists of a plurality of converter elements, wherein the converter elements can each be connected on the inverter side to one or more machines.

For example, the power converter Bordline CC1500 DE from ABB consists of two such converter elements, wherein said converter elements are connected in parallel on the generator side, that is to say on the rectifier side, and are each connected on the machine side, that is to say on the load side, to separate electric machines. Such a solution requires that the converter element topology, in particular rectifier topologies, that is to say the rectifier circuits, are matched to one another to the extent that no equalization currents, that is to say short-circuit currents, are produced between the converter elements.

In relation to the power converter topology of the Bordline CC1500 DE, a joint energy supply leads to the parallel-connected rectifier circuits of the converter elements having to be configured as passive rectifier circuits. Four-quadrant actuators, that is to say active rectifier circuits, cannot be used since the switching processes of said four-quadrant actuators would lead to undesired equalization currents between the two four-quadrant actuators.

In relation to the energy supply of the Bordline CC1500 DE, the use of passive rectifier circuits, in particular the unidirectional flow of energy from the energy supply to the converter element resulting therefrom, results in only specific energy supplies being able to be used. Some embodiments of the energy supply, for example the use of an asynchronous machine, require a bidirectional flow of energy, for example for magnetization of the asynchronous machine. The power converter topology of the Bordline CC1500 DE and similar topologies thus make it impossible to use energy supplies of this kind.

It is the object of the invention to specify a power converter, which can supply power from an energy supply to converter elements connected in parallel on the rectifier side without restricting the type of energy supply used and/or the rectifier circuit topology used.

DISCLOSURE OF THE INVENTION

This object is achieved by the power converter as claimed in claim 1 and by the drive system as claimed in the other independent claim.

Further advantageous embodiments of the present invention are specified in the dependent claims.

The invention provides a power converter for operating a first electric machine and a second electric machine, wherein the power converter comprises a first converter element, a second converter element and a first terminal connection, a second terminal connection and a third terminal connection for connecting the power converter to a three-phase energy supply, wherein the first converter element comprises a first rectifier circuit and a second rectifier circuit, the second converter element comprises a third rectifier circuit, wherein the first rectifier circuit has a first AC-side pole and a second AC-side pole, the second rectifier circuit has a third AC-side pole and a fourth AC-side pole and the third rectifier circuit has a fifth AC-side pole and a sixth AC-side pole, the first rectifier circuit and the second rectifier circuit are connected in parallel on the DC-voltage side and are connected to a common first DC-voltage-side pole and a common second DC-voltage-side pole, wherein the third rectifier circuit is connected on the DC-voltage side to a third DC-voltage-side pole and a fourth DC-voltage-side pole, wherein the first DC-voltage-side pole is at least connectable to the third DC-voltage-side pole by means of a first current path and the second DC-voltage-side pole is at least connectable to the fourth DC-voltage-side pole by means of a second current path, wherein at least the first current path or the second current path comprises a semiconductor switch.

It proves to be advantageous to be able to supply energy from the energy supply to the first converter element, in particular to the first DC voltage intermediate circuit, by means of the first rectifier circuit and the second rectifier circuit. The second converter element, in particular the second DC voltage intermediate circuit, can be supplied with energy from the first DC voltage intermediate circuit through the closure of the first current path and the second current path. As seen from the energy supply, the second DC voltage intermediate circuit is charged indirectly, that is to say via the first DC voltage intermediate circuit. This indirect supply of energy to the second converter element makes it possible to supply energy to both converter elements from one energy supply without having to connect the two converter elements to the same energy supply here. AC-side equalization currents between the rectifier circuits are eliminated. A power converter of this kind makes it possible to supply power to both converter elements from one energy supply without restrictions with respect to the converter element topology and/or energy supply type.

According to a preferred embodiment of the power converter, the semiconductor switch is part of the first rectifier circuit or third rectifier circuit.

If the second converter element is charged by means of the DC voltage intermediate circuit of the first converter element, the third rectifier circuit is not required for connecting to the energy supply. The third rectifier circuit, in particular the semiconductor switches of the third rectifier circuit, can therefore be used as switches in the first current path and/or in the second current path.

Only three AC-side poles are required for connecting the three-phase energy supply to the first converter element. Consequently, one of the AC-side poles of the first rectifier circuit or the second rectifier circuit is free. Said AC-side pole, in particular the semiconductor switch of the corresponding phase winding of the rectifier circuit, can be used as a switch for connection in the first current path or second current path.

This preferred embodiment of the converter element uses present, otherwise unused semiconductor switches as switching elements in the first and/or second current path. Additional components are thus not necessary, as a result of which the converter element is more compact and more cost-effective.

Furthermore, it proves to be advantageous that the semiconductor switches have a conductive resistance. The semiconductor switches in the first current path or second current path can serve for damping in addition to their switching function. Owing to its conductive resistance, said semiconductor switch suppresses oscillations between the first DC voltage intermediate circuit and the second DC voltage intermediate circuit, in particular between the possibly present energy storage capacity of the two DC voltage intermediate circuits. As a result, there is no need for separate damping resistors. This in turn makes a more compact and more cost-effective power converter possible.

According to a further, preferred embodiment of the power converter, the first terminal connection is at least connectable to the third AC-side pole, the second terminal connection is at least connectable to the fourth AC-side pole, and the third terminal connection is at least connectable to the first AC-side pole.

It proves to be advantageous that the three-phase energy supply can be connected to the power converter, in particular the first converter element, that is to say the first rectifier circuit and the second rectifier circuit. Since the rectifier circuits are connected in parallel on the DC-voltage side, that is to say both rectifier circuits are connected to the first DC voltage intermediate circuit, the three AC-side poles of the two rectifier circuits, that is to say the first AC-side pole, the second AC-side pole and the third AC-side pole, each form a phase terminal connection of a three-phase bridge rectifier. The first DC voltage intermediate circuit is thus supplied with power by a six-pulse rectifier. The advantages of a six-pulse rectifier compared to other three-phase rectifiers, for example one half-wave rectifier per phase of the energy supply, are known very well to those skilled in the art.

According to a further, preferred embodiment of the power converter, the first current path comprises a first partial current path, wherein the first DC-voltage-side pole and the fifth AC-side pole are at least connectable by means of said first partial current path, and the second current path comprises a second partial current path, wherein the second AC-side pole and the sixth AC-side pole are at least connectable by means of said second partial current path.

It proves to be advantageous that the first partial current path, like the second partial current path as well, connects, in the first and second current path, respectively, the corresponding poles of the first rectifier circuit and the third rectifier circuit to one another. The first partial current path and the second partial current path thus constitute the parts of the first current path and the second current path, respectively, that run between the rectifier circuits. If the first partial current path and the second partial current path, respectively, are connectable, this results in the advantageous property that the current paths can be disconnected independently of the switching state of the semiconductor switch/switches, that is to say, for example, independently of the switching state of the rectifier circuits. That is to say the connection of the first DC-voltage-side pole and the third DC-voltage-side pole, that is to say the first current path, can be disconnected independently of the switching states of the semiconductor switches in the phase winding of the first AC-side pole. Analogously thereto, the connection of the second DC-side pole and the fourth DC-side pole, that is to say the second current path, can be disconnected independently of the switching states of the semiconductor switches in the phase winding of the second AC-side pole and the semiconductor switches in the phase winding of the sixth AC-side pole. This affords the possibility of disconnecting the connection of the two power converters and using the two converter elements independently of one another.

According to a further, preferred embodiment of the power converter, the power converter additionally comprises a switching unit, which switching unit is provided for switching over between switching states, wherein, in a first switching state, the switching unit closes the first partial current path and closes the second partial current path and, in a second switching state, the switching unit interrupts at least the first partial current path or the second partial current path.

It proves to be advantageous that the two converter elements of the power converter can be connected to one another or isolated from one another by the switching unit. In the first switching state, the first converter element and the second converter element, in particular the first rectifier circuit and the third rectifier circuit, are connected by the switching unit, that is to say by a closed first partial current path and a closed second partial current path. If the semiconductor switches in the two current paths are closed as well, the first DC voltage intermediate circuit and the second DC voltage intermediate circuit are connected in this first switching state. Said first switching state permits the supply of energy to the second DC voltage intermediate circuit from the first DC voltage intermediate circuit. In the second switching state, at least the first partial current path or the second partial current path is open. In this switching state, independently of the switching states of the semiconductor switches, the supply of energy to the second DC voltage intermediate circuit cannot be effected from the first DC voltage intermediate circuit. In this switching state, the first rectifier circuit and the third rectifier circuit can be operated independently of one another.

It further proves to be advantageous that conventional single-phase rectifier circuits can be interconnected by way of the switching unit in a simple manner in such a way that the power converter can be operated using a three-phase energy supply. In other words, the switching unit makes it possible to supply power to the power converter using the three-phase energy supply even though the rectifier circuits are configured as conventional, single-phase rectifier circuits. That is to say that the conventional single-phase rectifier circuits can be used both for constructing a power converter for a single-phase energy supply as well as—thanks to the switching unit—for the construction of a power converter for a three-phase energy supply. The switching unit therefore permits standardization of various power converters to the extent that the power converters can be configured with the same conventional single-phase rectifier circuits regardless of the type of energy supply—single-phase or three-phase. This leads to simplifications in production and, as a result, to cost savings.

According to a further, preferred embodiment of the power converter, the power converter additionally comprises a fourth terminal connection and a fifth terminal connection for connecting the power converter to a single-phase energy supply, wherein, in the first switching state, the switching unit connects the first terminal connection to the third AC-side pole, connects the second terminal connection to the fourth AC-side pole, connects the third terminal connection to the first AC-side pole, wherein, in the second switching state, the switching unit connects the first AC-side pole to the fourth terminal connection and the second AC-side pole to the fifth terminal connection.

It proves to be advantageous that the power converter can connect the first converter element selectively to the terminal connections for a three-phase energy supply or to the terminal connections for a single-phase energy supply by way of the switching unit. In this embodiment, the power converter can be operated selectively using different energy supplies by way of the switching unit. In the first switching state, that is to say when the first converter element is connected to the terminal connections for the three-phase energy supply, the first rectifier circuit and the second rectifier circuit, as described above and in the following text, can be operated as a six-pulse rectifier circuit and thus supply energy from the three-phase energy supply to the first DC voltage intermediate circuit. In this switching state, the second converter element, as described above and in the following text, is supplied with energy from the first converter element. In the second switching state, the first converter element, in particular the rectifier circuit, can be operated as a single-phase rectifier, for example as a bridge rectifier, and thus supply energy from the single-phase energy supply to the first DC voltage intermediate circuit.

The switchover between the terminal connections can take place based on the availability of the various energy supplies. One of the energy supplies, for example the single-phase energy supply, can preferably be used, wherein it is possible to switch over to the other energy supply when said preferred energy supply is unavailable. If both energy supplies are available, further criteria can influence the switchover.

It proves to be advantageous that the power converter with the conventional single-phase rectifier circuits can be operated selectively at a three-phase or single-phase energy supply by way of the switching unit. In other words, the switching unit makes it possible to switch over between the single-phase energy supply and the three-phase energy supply even though the rectifier circuits of the converter elements are formed by conventional single-phase rectifier circuits.

According to a further, preferred embodiment of the power converter, in the second switching state, the switching unit connects the first AC-side pole and the third AC-side pole to one another and connects the second AC-side pole and the fourth AC-side pole to one another.

It proves to be advantageous that, in the second switching state, the first rectifier circuit and the second rectifier circuit are connected in parallel on the AC side. The first DC voltage intermediate circuit can thus be supplied with power by means of the first rectifier circuit and the second rectifier circuit at the same time, as a result of which the available power of the rectifiers is greater or the rated power of the individual rectifier can be lower.

According to a further, preferred embodiment of the power converter, the power converter comprises a sixth terminal connection and a seventh terminal connection for connecting the power converter to the single-phase energy supply, wherein, in the second switching state, the switching unit connects the fifth AC-side pole to the sixth AC-side pole and connects the sixth AC-side pole to the seventh AC-side pole.

It proves to be advantageous that, in the second switching state, the first converter element and the second converter element, in particular the first DC voltage intermediate circuit and the second DC voltage intermediate circuit simultaneously, can thus be supplied with energy from the single-phase energy supplies directly.

According to a further, preferred embodiment of the power converter, the second converter element comprises a fourth rectifier circuit, wherein the fourth rectifier circuit has a seventh AC-side pole and an eighth AC-side pole, wherein the third rectifier circuit and the fourth rectifier circuit are connected in parallel on the DC-voltage side and are connected to the third DC-voltage-side pole and the fourth DC-voltage-side pole, wherein, in the second switching state, the switching unit connects the fifth AC-side pole and the seventh AC-side pole to one another and connects the sixth AC-side pole and the eighth AC-side pole to one another.

It proves to be advantageous that the second converter element is equivalent to the first converter element, as a result of which the advantages mentioned above and in the following text apply equally to the two converter elements. In particular, in the second switching state, the third rectifier circuit and the fourth rectifier circuit are connected in parallel on the AC side and on the DC side, as a result of which the second DC voltage intermediate circuit can be supplied with power by means of the first rectifier circuit and second rectifier circuit simultaneously. Particularly in this embodiment, the operation of the power converter with the single-phase energy supplies can constitute the preferred energy supply that is used, provided that it is available. In this embodiment, the first and second DC voltage intermediate circuit are each supplied with power by two bridge rectifiers. In contrast, in the first switching state, the first and second DC voltage intermediate circuit are supplied with power from a single six-pulse rectifier. If all of the rectifier circuits are dimensioned for the same power, this means a lower power in the first switching state in comparison with the second switching state. That is to say that the switching unit is preferably operated in the second switching state. If the single-phase energy supply is not available, the switching unit can connect the power converter to the three-phase energy supply by switching over to the second switching state. In this switching state, energy is supplied to the second converter element, as described above and in the following text, indirectly.

According to a further, preferred embodiment of the power converter, at least one of the first rectifier circuit, second rectifier circuit, third rectifier circuit or fourth rectifier circuit is configured as a four-quadrant actuator.

It proves to be advantageous that four-quadrant actuators permit a bidirectional flow of energy and said bidirectional flow of energy makes possible the magnetizing energy of the energy supply, that is to say a flow of energy from the four-quadrant actuator to the energy supply. Three-phase energy supplies, particularly some forms of electric machines, for example asynchronous machines, require magnetizing energy. A power converter configured in such a way therefore provides flexibility with respect to the types of energy supply that can be connected and permits the use of robust and cost-effective asynchronous machines. It further proves to be advantageous that the rectifier circuit is embodied in bidirectional fashion as a four-quadrant actuator, since, as a result, the power converter can recuperate energy, that is to say that energy of the load-side electric machine, for example braking energy, can feed into the single-phase energy supply.

According to a further, preferred embodiment of the power converter, the switching unit comprises electromechanical changeover switches for switching over between the first switching state and the second switching state.

It proves to be advantageous that the switching unit can thus be simply constructed and wired as a separate submodule of the power converter, consisting of a multiplicity of electromechanical changeover switches. Said switching unit allows conventional single-phase rectifier circuits to be interconnected in a cost-effective and simple manner such that the converter element can also be operated with a three-phase energy supply. Said switching unit allows the power converter with conventional single-phase bidirectional rectifier circuits to be operated selectively with a three-phase energy supply, for example an asynchronous machine, or with a single-phase energy supply, for example a railroad electrical network. The switching unit makes it possible to easily switch over between said energy supplies.

The invention provides a drive unit, which drive unit comprises a power converter, as described above and in the following text, comprises a first DC voltage intermediate circuit, which first DC voltage intermediate circuit is connected to the first DC-voltage-side pole and the second DC-voltage-side pole, and comprises a second DC voltage intermediate circuit, which second DC voltage intermediate circuit is connected to the third DC-voltage-side pole and the fourth DC-voltage-side pole, comprises a three-phase energy supply, which three-phase energy supply is connected to the first terminal connection, the second terminal connection and the third terminal connection.

According to a further, preferred embodiment of the drive unit, the first DC voltage intermediate circuit and the second DC voltage intermediate circuit are configured as capacitive DC voltage intermediate circuits.

It proves to be advantageous that the first converter element and the second converter element are configured as voltage source converter elements. The advantages of a voltage source converter element are known very well to those skilled in the art.

According to a further, preferred embodiment of the drive unit, the three-phase energy supply is configured as an asynchronous generator.

It proves to be advantageous that asynchronous machines are robust, available with a wide variety of technical parameters, in particular rated powers, as standard and cost-effective.

According to a further, preferred embodiment, the drive unit additionally comprises the single-phase energy supply, wherein the single-phase energy supply is configured as a transformer, wherein the transformer comprises a first secondary winding for tapping a first secondary voltage, wherein the fourth terminal connection is connected to a first outgoing circuit of the first secondary winding and the fifth terminal connection is connected to a second outgoing circuit of the first secondary winding.

It proves to be advantageous that the drive unit can be connected as a result with the primary side of the transformer directly to a supply network, for example a medium-voltage supply network.

According to a further, preferred embodiment of the drive unit, the transformer comprises a second secondary winding for tapping a second secondary voltage, wherein the sixth terminal connection is connected to a first outgoing circuit of the second secondary winding and the seventh terminal connection is connected to a second outgoing circuit of the second secondary winding.

It proves to be advantageous that, in the two secondary windings, the individual windings have to be dimensioned for a lower power and that a more simple wiring with the converter elements is made possible.

According to a further, preferred embodiment of the drive unit, the first secondary voltage and the second secondary voltage have the same electrical characteristics.

It proves to be advantageous that the transformer can be embodied in a simple manner as a result and still provides redundancy.

According to a further, preferred embodiment of the drive unit, the first DC voltage intermediate circuit is connected to the first electric machine by means of a first inverter and the second DC voltage intermediate circuit is connected to the second electric machine by means of a second inverter.

It proves to be advantageous that both the first converter element and the first electric machine and also the second converter element and the second electric machine each form an independent drive subunit. A failure of a drive subunit has no direct influence on the other drive subunit. The operation of the drive unit is possible using only one drive subunit even though the drive power is reduced by the omission of a drive subunit.

It proves to be advantageous that the switching unit is configured in such a way that the three-phase energy supply can be connected both to the rectifier circuits of the first converter element and to the rectifier circuits of the second converter element. In other words, it proves to be advantageous that the switching unit is configured in such a way that, in the second switching state, said switching unit can switch over between two switching substrates, wherein the first switching substrate connects the terminal connections for the three-phase energy supply to the AC-side poles of the first converter element and wherein, in the second switching substrate, the switching unit connects the terminal connections for the three-phase energy supply to the AC-side poles of the second converter element. In the case of failure of one or both rectifier circuits of the one converter element, it is thus possible to switch over to the other converter element and to furthermore ensure the supply of power to both electric machines.

According to a further, preferred embodiment of the drive unit, the drive unit is provided for driving a vehicle, wherein the vehicle is track-guided.

It proves to be advantageous that, by way of the drive unit, the vehicle can be connected both to a single-phase energy supply, for example to a 15 kV, 16⅔ Hz railroad electrical network, and to a three-phase energy supply, and, if required—for example in the case of failure of the single-phase energy supplies or in the case of traveling on a non-electrified line—can be switched over to the three-phase energy supply, for example to a diesel generator inside a vehicle, which diesel generator drives a three-phase asynchronous machine. It further proves to be advantageous that, even in the case of failure of a drive subunit, the vehicle can continue to be driven by the other drive subunit in order, for example, to be able to move the vehicle to a location where repairs can be carried out, that is to say, for example, to a siding.

Figure 2:
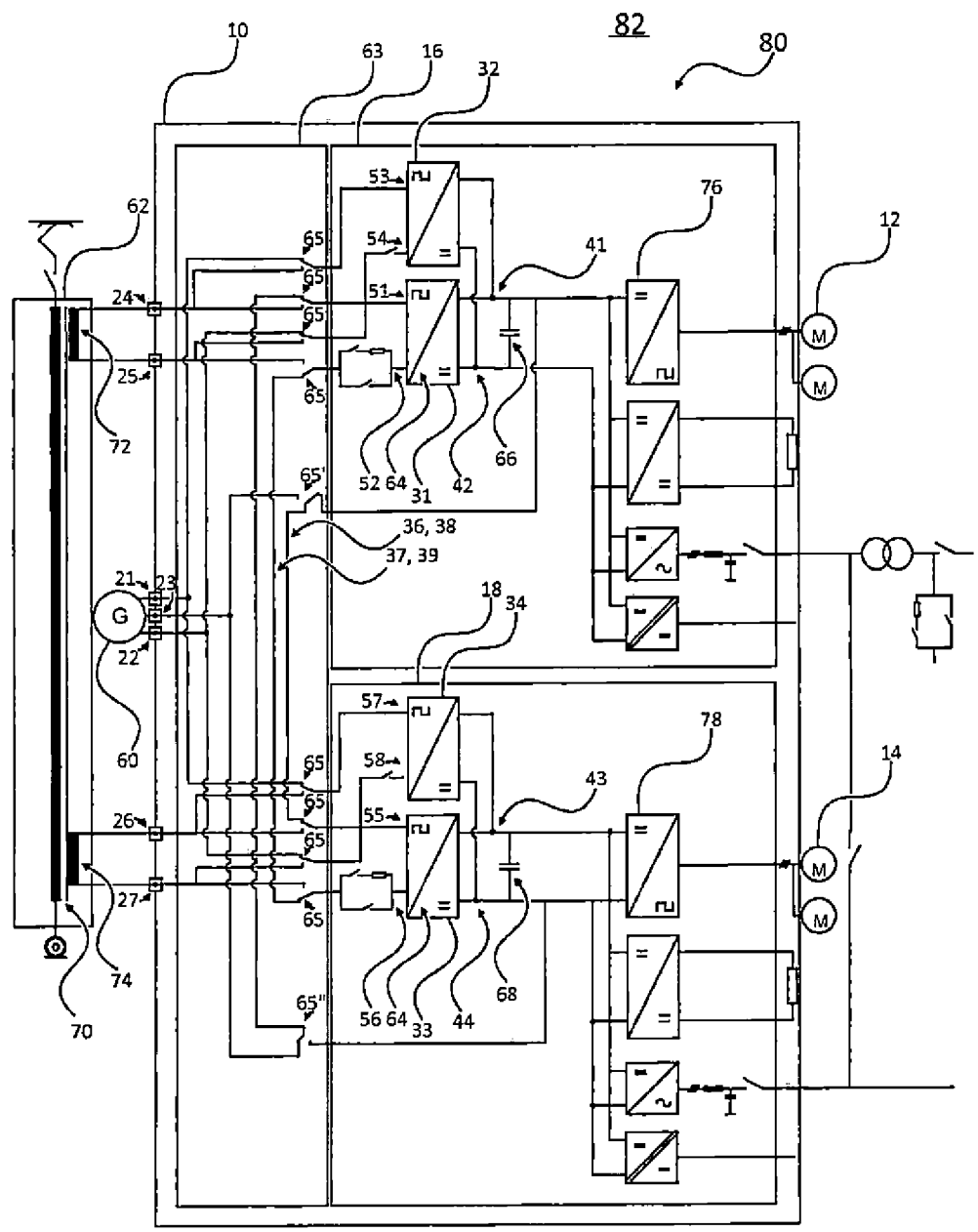

In the drawings, purely schematically,

FIG. 1 shows a first exemplary embodiment of a power converter according to the invention; and FIG. 2 shows a second exemplary embodiment of a power converter according to the invention and also a vehicle according to the invention.

In the figures, identical components or elements or components or elements that have the same function are denoted by the same reference symbols, wherein a repeated description of said components and elements that have the same function is omitted.

FIG. 1 shows a power converter 10 for operating a first electric machine 12 and a second electric machine 14. The electric machine 12, 14, that is to say the first electric machine 12 and the second electric machine 14, can be configured as DC or AC machines, wherein all of the embodiments of DC and AC machines know to those skilled in the art can be used. Said electric machines can in this case be single-phase or multiphase, in particular three-phase, machines, as is shown in FIG. 1. The electric machines 12, 14 can be, in particular, asynchronous machines.

The power converter 10 further comprises a first converter element 16, a second converter element 18 and a first terminal connection 21, a second terminal connection 22 and a third terminal connection 23 for connecting the power converter 10 to a three-phase energy supply 60. The terminal connections 21, 22, 23, that is to say terminal connection 21, terminal connection 22 and terminal connection 23, are provided to electrically connected the power converter 10 to the energy supply 60 and to thereby make it possible for energy to flow from the three-phase energy supply 60 to the power converter 10.

The first converter element 16 comprises a first rectifier circuit 31 and a second rectifier circuit 32. The second converter element 18 comprises a third rectifier circuit 33. The first rectifier circuit 31 has a first AC-side pole 51 and a second AC-side pole 52. The second rectifier circuit 32 has a third AC-side pole 53 and a fourth AC-side pole 54. The third rectifier circuit 33 has a fifth AC-side pole 55 and a sixth AC-side pole 56. The first rectifier circuit 31, the second rectifier circuit 32 and the third rectifier circuit 33 can be embodied, for example, as two-pulse bridge circuits.

As shown in FIG. 1, the first rectifier circuit 31 and the second rectifier circuit 32 are connected in parallel on the DC-voltage side and to this end are connected to a common first DC-voltage-side pole 41 and a common second DC-voltage-side pole 42. In other words, as is shown in FIG. 1, a first DC-side pole of the first rectifier circuit 31 is connected to the first DC-voltage-side pole 41 and a first DC-voltage-side pole of the second rectifier circuit 32 is also connected to the first DC-voltage-side pole 41. A second DC-voltage-side pole of the first rectifier circuit 31 is connected to the second DC-voltage-side pole 42 and a second DC-voltage-side pole 42 of the second rectifier circuit 32 is also connected to the second DC-voltage-side pole 42. The third rectifier circuit 33 is connected on the DC-voltage side to a third DC-voltage-side pole 43 and a fourth DC-voltage-side pole 44. In other words, a first DC-voltage-side pole of the third rectifier circuit 33 is connected to the third DC-voltage-side pole 43 and a second DC-voltage-side pole of the third rectifier circuit 33 is connected to the fourth DC-voltage-side pole 44.

According to the invention, the first DC-voltage-side pole 41 is at least connectable to the third DC-voltage-side pole 43 by means of a first current path 36. The second DC-voltage-side pole 42 is at least connectable to the fourth DC-voltage-side pole 44 by means of a second current path 37. At least the first current path 36 or the second current path 37 comprise a semiconductor switch 64.

As is shown in FIG. 1, the first current path 36 can comprise a semiconductor switch 64, which is part of the third rectifier circuit 33. The second current path 37 can comprise a semiconductor switch 64, which is part of the first rectifier circuit 31 and can comprise a further semiconductor switch 64, which is part of the third rectifier circuit 33.

In further exemplary embodiments, only one of the current paths 36, 37 contains a semiconductor 64. In a further exemplary embodiment, the semiconductor switch is embodied as a separate component, that is to say not as part of one of the rectifier circuits 31, 32, 33, 34. In one exemplary embodiment, only one of the current paths 36, 37, that is to say the first current path 36 or the second current path 37, has a semiconductor switch 64. The semiconductor switch 64 can be embodied as a separate component.

The semiconductor switch 64 can be configured as an IGBT, IGCT, diode, thyristor or as another power semiconductor switch known to those skilled in the art.

In the exemplary embodiment according to FIG. 1, the current paths 36, 37 each comprise a semiconductor switch 64. In this exemplary embodiment, the third rectifier 33 comprises the semiconductor switch 64 of the first current path 36 and the first rectifier 31 comprises the semiconductor switch 64 of the second current path 37.

The current paths 36, 37 can comprise a plurality of switching elements. The current paths 36, 37 can have mechanical switches and semiconductor switches 64 in the same current path, as is shown in FIG. 1 for the first current path 36 and the second current path 37.

The semiconductor switch 64 can be part of the first rectifier circuit 31 or third rectifier circuit 33. In FIG. 1, the first current path 36 leads via an electromechanical switch 65' and via a semiconductor switch 64 of the third rectifier circuit 33, which semiconductor switch 64 is formed, for example, by an IGBT and an antiparallel diode. The second current path 37 leads via a semiconductor switch 64 of the first rectifier circuit 31 and via a semiconductor switch 64 of the third rectifier circuit 33, wherein both semiconductor switches 64 are formed by an IGBT comprising an antiparallel diode, for example, and an electromechanical switch 65".

The first terminal connection 21 is at least connectable to the third AC-side pole 53. The second terminal connection 22 is at least connectable to the fourth AC-side pole 54 and the third terminal connection 23 is at least connectable to the first AC-side pole 51. The terminal connections 21, 22, 23 can each be connected to the respective AC-side pole 51, 53, 54 by means of a switch 65, for example by means of an electromechanical switch 65, as is shown in FIG. 1.

The first current path 36 comprises a first partial current path 38. The first DC-voltage-side pole 41 and the fifth AC-side pole 55 are at least connectable by means of said first partial current path 38.

The second current path 37 comprises a second partial current path 39. The second AC-side pole 52 and the sixth AC-side pole 56 are at least connectable by means of said second partial current path 39.

The first partial current path 38 and the second partial current path 39 can contain electromechanical switches 65, as is shown in FIG. 1.

In a further exemplary embodiment, a precharging unit, that is to say a parallel circuit composed of a series-connected precharging resistor and switches and a switch, can be connected upstream of one or more of the AC-side poles 51, 52, 53, 54, 55, 56, 57, 58. Said precharging unit aims to charge the energy store of the DC voltage intermediate circuit in a safe manner, that is to say damped manner. In one exemplary embodiment, each of the two converter elements 16, 18 contains at least one precharging unit, as is shown in FIG. 1. Alternatively, a switch can be connected upstream of one or more of the AC-side poles 51, 52, 53, 54, 55, 56, 57, 58. The circuit leading to the corresponding rectifier circuit can be interrupted using this switch. In other words, the rectifier circuit can be isolated from the corresponding energy supply. A switch can be connected upstream of the AC-side poles 54, 58, for example, as is shown in FIG. 1. Rectifier circuits without an upstream precharging device preferably have a switch of this kind in order that each of the rectifier circuits 31, 32, 33, 34 can be isolated from the energy supply.

FIG. 2 shows a power converter 10, which additionally comprises a switching unit 63. Said switching unit 63 is provided for the switchover between switching states. In a first switching state, which corresponds to the state illustrated in FIG. 2, the switching unit 63 closes the first partial current path 38 and the second partial current path 39. In other words, in a first switching state, an electrical connection exists between the first DC-voltage-side pole 41 and the fifth AC-side pole 55 and an electrical connection exists between the second AC-side pole 52 and the sixth AC-side pole 56. Thanks to the connections of the switching unit 63 in the first switching state, there is the option to close the current paths 36, 37 depending on the switching states of the semiconductor switches 64 and as a result to make it possible to exchange energy between the first DC voltage intermediate circuit 66 and the second DC voltage intermediate circuit 68. The conductive resistance of the one or the plurality of semiconductor switches 64 in the current paths 36, 37 and the conductive resistance of the connecting lines, also like possible switches 65, can further serve as damping means against oscillations between the DC voltage intermediate circuits 66, 68.

In a further exemplary embodiment, the power converter 10 additionally comprises a fourth terminal connection 24 and a fifth terminal connection 25 for connecting the power converter 10 to a single-phase energy supply 62. In the first switching state, which corresponds to the state illustrated in FIG. 2, the switching unit 63 connects the first terminal connection 21 to the third AC-side pole 53, the second terminal connection 22 to the fourth AC-side pole 54, the third terminal connection 23 to the first AC-side pole 51, as is shown in FIG. 2. This switching state makes it possible to refer energy from the three-phase energy supply 60 to the power converter 10. In this switching state, the first DC voltage intermediate circuit 66 can be charged using energy from the three-phase energy supply 60 by means of the AC-side poles 51, 53, 54 and the corresponding phase windings of the rectifier circuits 31, 32.

As seen from the first DC voltage intermediate circuit 66, the first AC-side pole 51, together with the corresponding phase winding of the first rectifier circuit 31, the third AC-side pole 53, together with the corresponding phase winding of the second rectifier circuit 32, and the fourth AC-side pole 54, together with the corresponding phase winding of the second rectifier circuit 32, form a three-phase rectifier circuit, for example a six-pulse rectifier. In the second switching state, the switching unit 63 connects the first AC-side pole 51 to the fourth terminal connection 24 and the second AC-side pole 52 to the fifth terminal connection 25. This switching state makes it possible to refer energy from the single-phase energy supply 62 to the power converter 10, in particular to the first converter element 16, by means of the first rectifier circuit 31. In this switching state, the first DC voltage intermediate circuit 66 can be supplied with energy from the single-phase energy supply 62 by means of the AC-side poles 51, 52 and the first rectifier circuit 31. As seen from the first DC voltage intermediate circuit 66, the first AC-side pole 51, together with the corresponding phase winding of the first rectifier circuit 31, and the second AC-side pole 52, together with the corresponding phase winding of the first rectifier circuit 31, form a rectifier, for example a bridge rectifier.

The converter element can thus be supplied with power by a single-phase energy supply 62 or a three-phase energy supply 60 depending on the switching state of the switching unit 63. For example, the single-phase energy supply can be embodied as an energy supply with energy being obtained from the overhead line and the three-phase energy supply 60 can constitute an autonomous energy supply, without connection to a superordinate network. It is possible, for example, to switch over between the energy supplies, or the switching states, depending on the availability of the energy supplies.

In a further exemplary embodiment, in the second switching state, the switching unit 63 additionally connects the first AC-side pole 51 and the third AC-side pole 53 to one another and the second AC-side pole 52 and the fourth AC-side pole 54 to one another, as shown in FIG. 2. This exemplary embodiment of the second switching state makes it possible to refer energy from the single-phase energy supply 62 to the power converter 10, in particular to the first converter element 16, by means of the first rectifier circuit 31 and the second rectifier circuit 32. The first rectifier circuit 31 and the second rectifier circuit 32 are electrically connected in parallel on the AC side and on the DC side in this switching state.

In a further exemplary embodiment, the power converter 10 comprises a sixth terminal connection 26 and a seventh terminal connection 27 for connecting the power converter 10 to the single-phase energy supply 62. In the second switching state, the switching unit 63 connects the fifth AC-side pole 55 to the sixth terminal connection 26 and the sixth AC-side pole 56 to the seventh terminal connection 27, as is shown in FIG. 2. This exemplary embodiment makes it possible to supply energy from the single-phase energy supply 62 to the power converter 10, the first converter element 16 and also the second converter element 18 simultaneously by means of the corresponding rectifier circuits.

In one exemplary embodiment of the power converter 10, the second converter element 18 comprises a fourth rectifier circuit 34, as is shown in FIG. 2. The fourth rectifier circuit 34 has a seventh AC-side pole 57 and an eighth AC-side pole 58. The third rectifier circuit 33 and the fourth rectifier circuit 34 are connected in parallel on the DC-voltage side and are connected to the third DC-voltage-side pole 43 and the fourth DC-voltage-side pole 44. In this exemplary embodiment, in the second switching state, the switching unit 63 connects the fifth AC-side pole 55 and the seventh AC-side pole 57 to one another and the sixth AC-side pole 56 and the eighth AC-side pole 58 to one another. This exemplary embodiment makes it possible to refer energy from the single-phase energy supply 62 to the power converter 10, in particular to the second converter element 18, simultaneously by means of the third rectifier circuit 33 and the fourth rectifier circuit 34. In the second switching state of this exemplary embodiment, the third rectifier circuit 33 and the fourth rectifier circuit 34 are electrically connected in parallel both on the DC side and the AC side.

In a further exemplary embodiment of the power converter 10, at least one of the first rectifier circuit 31, second rectifier circuit 32, third rectifier circuit 33 or fourth rectifier circuit 34 is configured as a four-quadrant actuator. The four-quadrant actuator makes a bidirectional flow of energy possible, that is to say both a transfer of energy from the DC side to the AC side, and also a transfer of energy in the reverse direction, that is to say from the AC side to the DC side. As a result, the four-quadrant actuator makes, among other things, the magnetization of the energy supply to which it is connected possible, in particular the magnetization of a generator, for example an asynchronous generator. The bidirectional four-quadrant actuator furthermore makes it possible for the power converter 10 to recuperate energy into the energy supply. In other words, the four-quadrant actuator makes it possible to provide the power converter 10 with energy from the load-side machines 12, 14 of the energy supply. Said energy is provided in the generator operation of the machines 12, 14, for example during a braking process of the machines 12, 14, and can be recuperated by the power converter 10, for example into the single-phase energy supply 62 configured as a railroad electrical network.

In a further exemplary embodiment of the power converter 10, the switching unit 63 comprises electromechanical changeover switches 65 for switching over between the first switching state and the second switching state. The changeover switches comprise, for example, three terminal connections, wherein, during the switching process, the connection between the first terminal connection and the second terminal connection is opened and the connection between the first terminal connection and the third terminal connection is closed.

In one exemplary embodiment, each of the AC-side poles 51, 52, 53, 54, 55, 56, 57, 58 is connected to a changeover switch, as in shown in FIG. 2. The second terminal connection and the third terminal connection of the changeover switches are connected in order to establish the connections mentioned above and below, as is shown in FIG. 2. The closure of the first partial current path 38 in the first switching state can be achieved by a further changeover switch 65', as is shown in FIG. 2. Alternatively, this connection can also be configured as a simple switch.

In a further exemplary embodiment with the four rectifier circuits 31, 32, 33, 34, the switches 65' and switches 65" are configured as changeover switches, as is shown in FIG. 2. In the first switching state, the changeover switches 65' and 65" together make it possible to connect the three-phase energy supply 60 selectively to the first converter element 16 or the second converter element 18 and ensure here that in both cases the energy stores of the first DC voltage intermediate circuit 66 and the second DC voltage intermediate circuit 68 can be connected to one another. To this end, in the first switching state of the switching unit 63, the changeover switch 65' connects the fifth AC-side pole 55 selectively to the first DC-voltage-side pole 41 or the third terminal connection 23. In the first switching state, the changeover switch 65" connects the AC-side pole 51 selectively to the fourth DC-voltage-side pole 44 or the third terminal connection 23. If the switching unit 63 is situated in the first switching state and the changeover switch 65' is situated in the switching state in which it connects the fifth AC-side pole 55 to the third terminal connection 23 and the changeover switch 65" is situated in the switching state in which it connects the first AC-side pole 51 to the fourth DC-side pole 44, the second converter element 18, in particular the second DC voltage intermediate circuit 68, is supplied with energy from the three-phase energy supply 60. In this switching state, the first converter element 16, in particular the first DC voltage intermediate circuit 66, can be supplied with energy indirectly, that is to say not from the energy supply 60 but from the second DC voltage intermediate circuit 68, by way of the closure of the first current path 36 and the second current path 37. If the switching unit 63 is situated in the first switching state and the changeover switch 65' is situated, in contrast, in the switching state in which it connects the fifth AC-side pole 55 to the first DC-side pole 41 and the changeover switch 65" is situated, in contrast, in the switching state in which it connects the first AC-side pole 51 to the third terminal connection, the first converter element 16, in particular the first DC voltage intermediate circuit 66, is supplied with energy from the three-phase energy supply 60. In this switching state, the second converter element 18, in particular the second DC voltage intermediate circuit 68, can be supplied with energy indirectly, that is to say not from the energy supply 60 but from the first DC voltage intermediate circuit 66, by way of the closure of the first current path 36 and the second current path 37.

FIG. 2 furthermore shows a drive unit 80, which comprises the power converter 10. The drive unit furthermore comprises a first DC voltage intermediate circuit 66. The DC voltage intermediate circuit 66 is connected to the first DC-voltage-side pole 41 and the second DC-voltage-side pole 42. The drive unit also comprises a second DC voltage intermediate circuit 68.

The second DC voltage intermediate circuit 68 is connected to the third DC-voltage-side pole 43 and the fourth DC-voltage-side pole 44. The drive unit furthermore comprises the three-phase energy supply 60. The three-phase energy supply 60 is connected to the first terminal connection 21, the second terminal connection 22 and the third terminal connection 23.

In one exemplary embodiment of the drive unit 80, the first DC voltage intermediate circuit 66 and the second DC voltage intermediate circuit 68 are configured as capacitive DC voltage intermediate circuits, as is shown in FIG. 2. The DC voltage intermediate circuits 66, 68 essentially have the task of an energy buffer, that is to say of an energy store. Common embodiments of energy stores are known to those skilled in the art, wherein this embodiment can be used in the invention. The DC voltage intermediate circuits 66, 68 can alternatively be embodied as a current DC voltage intermediate circuit, for example.

In one exemplary embodiment of the drive unit 80, the three-phase energy supply 60 is configured as an asynchronous generator. In one exemplary embodiment, at least one of the rectifier circuits 31, 32, 33, 34 is configured as a four-quadrant actuator. The at least one four-quadrant actuator allows the asynchronous generator to be magnetized.

In a further exemplary embodiment, the drive unit 80 additionally comprises the single-phase energy supply 62. The single-phase energy supply 62 is configured as a transformer 70. The transformer 70 comprises a first secondary winding 72 for tapping a first secondary voltage. The fourth terminal connection 24 is connected to a first outgoing circuit of the first secondary winding 72 and the fifth terminal connection 25 is connected to a second outgoing circuit of the first secondary winding 72. In this exemplary embodiment, the single-phase energy supply is connected to the power converter by means of the fourth terminal connection 24 and the fifth terminal connection 25.

In a further exemplary embodiment of the drive unit 80, the transformer 70 comprises a second secondary winding 74 for tapping a second secondary voltage. The sixth terminal connection 26 is connected to a first outgoing circuit of the second secondary winding 74 and the seventh terminal connection 27 is connected to a second outgoing circuit of the second secondary winding 74. The first converter element 16 is thus fed by the first secondary winding and the second converter element 18 is fed by the second secondary winding. In a further exemplary embodiment, further secondary windings can be provided, for example a separate secondary winding for each of the rectifier circuits 31, 32, 33, 34.

In a further exemplary embodiment of the drive unit 80, the first secondary voltage and the second secondary voltage have the same electrical characteristics. In other words, the voltage of the first secondary winding has the same amplitude, frequency, phase and waveform as the voltage of the second secondary winding. A load connected to the first winding can thus be connected to the second secondary winding in a fully equivalent manner without any restriction.

The first secondary winding and the second secondary winding would thus be interchangeable among one another as well as connectable.

In a further exemplary embodiment of the drive unit 80, the first DC voltage intermediate circuit 66 is connected to the first electric machine 12 by means of a first inverter 76 and the second DC voltage intermediate circuit 68 is connected to the second electric machine 14 by means of a second inverter 78. The converter elements, that is to say the first converter element 16 and the second converter element 18, each operate a separate machine. In a further exemplary embodiment, the converter elements each operate a plurality of machines, as is shown in FIG. 2.

The converter elements 76, 78 are matched to the electric machines 12, 14. Said converter elements impose the required electrical variables on the electric machines 12, 14, that is to say voltage and current values with corresponding amplitude, frequency, phase and waveform. If the electric machines 12, 14 are DC machines, the converter elements 76, 78 can be configured as DC choppers. Other embodiments of a converter element that are matched to the type of electric machine 12, 14 used and known to those skilled in the art can be used. The converter elements 76, 78 are configured, for example, as three-phase inverters in order to drive three-phase AC machines, as is shown in FIG. 1 and FIG. 2.

The converter elements 76, 78 are supplied with energy from the DC voltage intermediate circuits 66, 68, that is to say from the first DC voltage intermediate circuit 66 and from the second DC voltage intermediate circuit 68. In a further exemplary embodiment, the converter element manages without an energy store. A converter element topology of this kind is known to those skilled in the art as a matrix converter.

In one exemplary embodiment, the two converter elements 16, 18 furthermore comprise a braking chopper. The braking chopper comprises a DC chopper and a braking resistor. The braking chopper protects the DC voltage intermediate circuit from overvoltage. The two converter elements 16, 18 can furthermore comprise an inverter. This inverter can be used to generate an auxiliary voltage supply and can supply power to auxiliary loads, such as, for example, air-conditioning systems, heating systems, auxiliary motors, etc. The converter elements 16, 18 can comprise a further DC chopper. Said DC chopper can be provided for charging a battery and comprise a DC-isolation means.

In a further exemplary embodiment of the drive unit 80, the drive unit 80 is provided for driving a vehicle 82. The vehicle 82 is track-guided. The vehicle can be, for example, a train, a subway train or a streetcar. The machines are intended to drive the bicycles of said vehicle.

LIST OF REFERENCE SYMBOLS

10 Power converter
12 First electric machine
14 Second electric machine
16 First converter element
18 Second converter element
21 First terminal connection
22 Second terminal connection
23 Third terminal connection
24 Fourth terminal connection
25 Fifth terminal connection
26 Sixth terminal connection
27 Seventh terminal connection
31 First rectifier circuit
32 Second rectifier circuit
33 Third rectifier circuit
34 Fourth rectifier circuit
36 First current path
37 Second current path
38 First partial current path
39 Second partial current path
41 First DC-voltage-side pole
42 Second DC-voltage-side pole
43 Third DC-voltage-side pole
44 Fourth DC-voltage-side pole
51 First AC-side pole
52 Second AC-side pole
53 Third AC-side pole
54 Fourth AC-side pole
55 Fifth AC-side pole
56 Sixth AC-side pole
57 Seventh AC-side pole
58 Eighth AC-side pole
60 Three-phase energy supply
62 Single-phase energy supply
63 Switching unit
64 Semiconductor switch
65 Electromechanical changeover switch
66 First DC voltage intermediate circuit
68 Second DC voltage intermediate circuit
70 Transformer
72 First secondary winding
74 Second secondary winding
76 First inverter
78 Second inverter
80 Drive unit
82 Vehicle

The invention claimed is:

1. A power converter for operating a first electric machine and a second electric machine, comprising:
   a first converter element, a second converter element and a first terminal connection, a second terminal connection and a third terminal connection for connecting the power converter to a three-phase energy supply, wherein
   the first converter element comprises a first rectifier circuit and a second rectifier circuit, the second converter element comprises a third rectifier circuit, wherein
   the first rectifier circuit has a first AC-side pole and a second AC-side pole, the second rectifier circuit has a third AC-side pole and a fourth AC-side pole and the third rectifier circuit has a fifth AC-side pole and a sixth AC-side pole,
   the first rectifier circuit and the second rectifier circuit are connected in parallel on the DC-voltage side and are connected to a common first DC-voltage-side pole and a common second DC-voltage-side pole, wherein
   the third rectifier circuit is connected on the DC-voltage side to a third DC-voltage-side pole and a fourth DC-voltage-side pole, wherein
   the first DC-voltage-side pole is at least connectable to the third DC-voltage side pole by means of a first current path and
   the second DC-voltage-side pole is at least connectable to the fourth DC-voltage-side pole by means of a second current path, wherein
   at least the first current path or the second current path comprises a semiconductor switch and the second converter element is supplied with energy from a first DC voltage intermediate circuit connected to the first DC-voltage-side pole and the second DC-voltage-side pole when the first current path and the second current path are closed.

2. The power converter as claimed in claim 1, wherein the semiconductor switch is part of the first rectifier circuit or third rectifier circuit.

3. The power converter as claimed in claim 1, wherein
the first terminal connection is at least connectable to the third AC-side pole,
the second terminal connection is at least connectable to the fourth AC-side pole and
the third terminal connection is at least connectable to the first AC-side pole.

4. A power converter for operating a first electric machine and a second electric machine, comprising:
a first converter element, a second converter element and a first terminal connection, a second terminal connection and a third terminal connection for connecting the power converter to a three-phase energy supply, wherein
the first converter element comprises a first rectifier circuit and a second rectifier circuit, the second converter element comprises a third rectifier circuit, wherein
the first rectifier circuit has a first AC-side pole and a second AC-side pole, the second rectifier circuit has a third AC-side pole and a fourth AC-side pole and the third rectifier circuit has a fifth AC-side pole and a sixth AC-side pole,
the first rectifier circuit and the second rectifier circuit are connected in parallel on the DC-voltage side and are connected to a common first DC-voltage-side pole and a common second DC-voltage-side pole, wherein
the third rectifier circuit is connected on the DC-voltage side to a third DC-voltage-side pole and a fourth DC-voltage-side pole, wherein
the first DC-voltage-side pole is at least connectable to the third DC-voltage-side pole by means of a first current path and
the second DC-voltage-side pole is at least connectable to the fourth DC-voltage-side pole by means of a second current path, wherein
at least the first current path or the second current path comprises a semiconductor switch,
the first current path comprises a first partial current path, wherein
the first DC-voltage-side pole and the fifth AC-side pole are at least connectable by means of said first partial current path, and
the second current path comprises a second partial current path, wherein
the second AC-side pole and the sixth AC-side pole are at least connectable by means of said second partial current path.

5. The power converter as claimed in claim 4, additionally comprising:
a switching unit, which switching unit is provided for switching over between switching states, wherein,
in a first switching state, the switching unit closes the first partial current path and closes the second partial current path and,
in a second switching state, the switching unit interrupts at least the first partial current path or the second partial current path.

6. The power converter as claimed in claim 5, additionally comprising a fourth terminal connection and a fifth terminal connection for connecting the power converter to a single-phase energy supply, wherein,
in the first switching state, the switching unit connects the first terminal connection to the third AC-side pole,
connects the second terminal connection to the fourth AC-side pole,
connects the third terminal connection to the first AC-side pole, wherein,
in the second switching state, the switching unit connects the first AC-side pole to the fourth terminal connection and the second AC-side pole to the fifth terminal connection.

7. The power converter as claimed in claim 5, wherein,
in the second switching state, the switching unit connects the first AC-side pole and
the third AC-side pole to one another and connects the second AC-side pole and
the fourth AC-side pole to one another.

8. The power converter as claimed in claim 5, wherein,
the power converter comprises a sixth terminal connection and a seventh terminal connection for connecting the power converter to a single-phase energy, wherein,
in the second switching state, the switching unit connects the fifth AC-side pole to the sixth terminal connection and connects the sixth AC-side pole to the seventh terminal connection.

9. The power converter as claimed in claim 5, wherein the second converter element comprises a fourth rectifier circuit, wherein
the fourth rectifier circuit has a seventh AC-side pole and an eighth AC-side pole wherein
the third rectifier circuit and the fourth rectifier circuit are connected in parallel on the DC-voltage side and are connected to the third DC-voltage-side pole and the fourth DC-voltage-side pole, wherein,
in the second switching state, the switching unit
connects the fifth AC-side pole and the seventh AC-side pole to one another and
connects the sixth AC-side pole and the eighth AC-side pole to one another.

10. The power converter as claimed in claim 1, wherein at least one of the first rectifier circuit, second rectifier circuit, third rectifier circuit or fourth rectifier circuit is configured as a four-quadrant actuator.

11. The power converter as claimed in claim 1, wherein at least the first rectifier circuit or the second rectifier circuit and at least the third rectifier circuit or the fourth rectifier circuit are configured as four-quadrant actuators.

12. The power converter as claimed in claim 1, wherein the switching unit comprises electromechanical changeover switches for switching over between the first switching state and the second switching state.

13. A drive unit, comprising:
a power converter, which power converter is configured as claimed in claim 1,
a first DC voltage intermediate circuitry, which first DC voltage intermediate circuit is connected to the first DC-voltage-side pole and the second DC-voltage-side pole, and
a second DC voltage intermediate circuit, which second DC voltage intermediate circuit is connected to the third DC-voltage-side pole and the fourth DC-voltage-side pole,
a three-phase energy supply, which three-phase energy supply is connected to the first terminal connection, the second terminal connection and the third terminal connection.

14. The drive unit as claimed in claim 13, wherein the first DC voltage intermediate circuit and the second DC voltage intermediate circuit are configured as capacitive DC voltage intermediate circuits.

15. The drive unit as claimed in claim 13, wherein the three-phase energy supply is configured as an asynchronous generator.

16. The drive unit as claimed in claim 13, additionally comprising the single-phase energy supply, wherein the single-phase energy is configured as a transformer, wherein
   the transformer comprises a first secondary winding for tapping a first secondary voltage, wherein
   the fourth terminal connection is connected to a first outgoing circuit of the first secondary winding and the fifth terminal connection is connected to a second outgoing circuit of the first secondary winding.

17. The drive unit as claimed in claim 16, wherein
   the transformer comprises a second secondary winding for tapping a second secondary voltage, wherein
   the sixth terminal connection is connected to a first outgoing circuit of the second secondary winding and the seventh terminal connection is connected to a second outgoing circuit of the second secondary winding.

18. The drive unit as claimed in claim 16, wherein the first secondary voltage and the second secondary voltage have the same electrical characteristics.

19. The drive unit as claimed in claim 13, wherein
   the first DC voltage intermediate circuit is connected to the first electric machine by means of a first inverter and
   the second DC voltage intermediate circuit is connected to the second electric machine by means of a second inverter.

20. The drive unit as claimed in claim 13, wherein the drive unit is provided for driving a vehicle, wherein the vehicle is track-guided.

\* \* \* \* \*